United States Patent
Elkin et al.

(10) Patent No.: US 6,879,140 B2
(45) Date of Patent: Apr. 12, 2005

(54) POWER HOLDUP CIRCUIT

(75) Inventors: Igor Elkin, Malden, MA (US); Ilya Bystryak, Salem, MA (US); Jack Schuss, Newton, MA (US); Tung M. Huynh, North Andover, MA (US); Vadim Lubomirsky, Rochester, NY (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 10/606,206

(22) Filed: Jun. 25, 2003

(65) Prior Publication Data

US 2004/0124821 A1 Jul. 1, 2004

Related U.S. Application Data

(63) Continuation-in-part of application No. 10/255,425, filed on Sep. 26, 2002.

(51) Int. Cl.[7] .................................................. G05F 5/00
(52) U.S. Cl. ..................................................... 323/303
(58) Field of Search ............................... 323/223, 226, 323/229, 231, 233, 268, 271, 273, 274, 299, 303

(56) References Cited

U.S. PATENT DOCUMENTS

| | | | | |
|---|---|---|---|---|
| 4,811,190 A | * | 3/1989 | Keir et al. ..................... 363/60 |
| 5,828,207 A | * | 10/1998 | Saadeh ........................ 323/281 |
| 6,201,721 B1 | * | 3/2001 | Suranyi et al. ............. 363/144 |
| 6,504,497 B2 | * | 1/2003 | Jang et al. ................... 341/125 |

* cited by examiner

Primary Examiner—Matthew V. Nguyen
(74) Attorney, Agent, or Firm—Harness, Dickey & Pierce, P.L.C.

(57) ABSTRACT

A power holdup circuit including a monitoring circuit and a power holdup circuit. The monitoring circuit includes an average voltage comparator and an absolute voltage comparator which cooperate to detect a voltage drop in the voltage supplied by the power supply. The monitoring circuit also includes a timer to determine the time period of the voltage dropout. If a predetermined voltage dropout event occurs, the monitoring circuit generates a control signal to a switching component which activates a holdup power source. The holdup power source includes an energy storage device that stores energy to maintain the supply voltage during dropout periods.

25 Claims, 3 Drawing Sheets

POWER HOLDUP CIRCUIT

CROSS-REFERENCE TO RELATED APPLICATIONS

This application is a continuation-in-part of U.S. patent application Ser. No. 10/255,425 filed on Sep. 26, 2002. The disclosure of the above application is incorporated herein by reference.

FIELD OF THE INVENTION

The present invention relates generally to systems for controlling line voltage, and more particularly to a circuit for maintaining power during line voltage dropouts in, for example, power conversion equipment.

BACKGROUND OF THE INVENTION

Power factor relates generally to the efficiency of a system in using power and is preferably maintained at a high level (i.e., 0.9 or higher) to minimize losses. In particular, power factor defines the relationship between the actual/active or real power being used by the system (i.e., measured in kilo-Watts (KW)) and the total power supplied and available to the system. Further, total power is defined by apparent power (i.e., measured in volt-amps (VA)), which includes a non-working component (i.e., reactive power (kVAR)). Thus, it is desirable to reduce, as much as possible, the reactive power component. Reactive power is generally not useful power, and typically provides for sustaining the electromagnetic field in systems.

Specifically, power factor is a value between 0 and 1, and represents the amount of power actually being used (i.e., real power divided by apparent power) by a device or system. A high power factor indicates that a system is using power efficiently, while a low power factor indicates that a system in using power less efficiently. Thus, when the power factor is 1, real power and apparent power are equal, with the system using power at 100% efficiency. However, when the current from a power source includes harmonics, or when it is not in phase with the voltage (e.g., reactive device), the power factor of the system is reduced (i.e., less than 1), thus indicating a less efficient system.

For example, reactive power may be caused by a phase shift between AC current and voltage in inductors and capacitors within a system. With respect to inductors causing phase shift, current is said to lag behind voltage, and in capacitors causing phase shift, current is said to lead voltage. Typically, when inductive loads cause lagging in a system, appropriate capacitors are used to correct and offset the lagging effect (i.e., increase power factor).

Depending upon the power supplier, the cost of receiving power may increase if power factor is not sustained at a specific minimum level (i.e., 0.9). Further, because power factor represents power that could be used, but is not, increasing the use of the available power will reduce overall cost. Additionally, larger wiring and transformers may be needed when power factor is low. Thus, a low power factor may have numerous negative effects on different aspects of a system.

Further, government regulations for certain power conversion equipment require high power factors (i.e., above 0.9). Additionally, regulations for semiconductor processing equipment also require sustaining power sources through line voltage dropouts, which further require energy storage elements at the power supply input that may need power correction. By way of example, semiconductor manufacturers frequently require that power supplies meet the standard SEMI F-47 specification in order to protect the integrated circuit fabrication process from voltage dropouts. The specification is summarized in part in the table below.

| VOLTAGE SAG DURATION | | | | VOLTAGE SAG Percent (%) of |
|---|---|---|---|---|
| Second(s) | Milliseconds(ms) | Cycles at 60 hz | Cycles at 50 hz | Equipment Nominal Voltage |
| <0.05 s | <50 ms | <3 cycles | <2.5 cycles | Not specified |
| 0.05 to 0.2 s | 50 to 200 ms | 3 to 12 cycles | 2.5 to 10 cycles | 50% |
| 0.2 to 0.5 s | 200 to 500 ms | 12 to 30 cycles | 10 to 25 cycles | 70% |
| 0.5 to 1.0 s | 500 to 1000 ms | 30 to 60 cycles | 25 to 50 cycles | 80% |
| >1.0 s | >1000 ms | >60 cycles | >50 cycles | Not Specified |

Power factor correction (PFC) devices are known that provide for maintaining the power factor at higher levels, typically above 0.85. Both passive and active devices have been developed in an attempt to increase and maintain the power factor of a system at a high level. In a passive approach, an inductor is provided at the input of the circuit or system, usually ahead of an electrolytic capacitor bank. This helps to reduce harmonic distortion within the system and allows equipment to obtain a power factor of between about 0.8 and 0.9. However, the inductance value required increases exponentially with the power factor improvement desired. When a power factor above 0.9–0.95 is desired or required, the size and weight of the inductor becomes prohibitive.

Active approaches include boost, buck, or flyback converters in connection with monitoring devices that monitor various variables within the system. In particular, the input voltage, the output voltage and current at the input of the system are monitored to maintain the power factor. However, although these PFC devices provide higher power factors (i.e., above 0.9), these devices are complex, resulting in their size and cost increasing significantly. Reliability of the system also may be reduced with the addition of these complex control components.

Thus, there exists a need for a system for maintaining power during a line voltage dropout that is less complex in design, lower in cost and that provides a higher power factor.

SUMMARY OF THE INVENTION

The present invention generally includes a circuit and method of providing the same that has holdup capability with a high power factor during line voltage dropout. The circuit is less complex in design and requires no external monitoring and control for providing the holdup capability. The present invention monitors the input voltage to a system and switches to a holdup power source when needed (e.g., during a single cycle line voltage dropout). Power from the primary source (i.e., line voltage) is restored after the dropout condition ends. The holdup power source is appropriately charged based upon the input power source to the system and the requirements of the system.

Specifically, in an embodiment of the present invention, a power holdup circuit of the present invention having a high power factor (e.g., about 0.9 or higher) generally includes monitoring means for monitoring input voltage and specifically, the difference between a power supply voltage and a holdup capacitor voltage, and switching means for turning on the holdup power source when the difference between the power supply voltage and holdup capacitor voltage exceeds a predetermined threshold voltage. The switching means may include a diode and a transistor, with the predetermined threshold voltage defined by the voltage rating of the diode plus the turn-on voltage of the transistor. The power holdup circuit may be turned on (i.e., switched on) when the difference between the power supply voltage and the holdup capacitor voltage exceeds the predetermined threshold voltage.

The diode may be a zener diode and the transistor may be a bipolar or metal-oxide-silicon field-effect transistor, IGBT, SCR, etc. Further, the holdup capacitor may be precharged to a predetermined level and charges through a diode of the transistor. A precharge resistor also may be provided to limit the peak current for charging the holdup capacitor. The power holdup circuit may be configured such that the monitoring and switching means provide a power factor of not less than about 0.9.

In another embodiment of the present invention, an input circuit adapted for maintaining power factor during line voltage dropout of a rectified alternating current source includes holdup means having stored power for use during voltage dropout, and control means for monitoring the difference between the voltage of the rectified alternating current source and the voltage of the holdup means. The control means is adapted to switch power from the rectified alternating current source to the holdup means when the difference exceeds a predetermined value.

The holdup means may include a capacitor adapted to be charged to the peak voltage value of the rectified alternating current source. The holdup means may further include a precharge resistor adapted for limiting the charging current to the capacitor. The control means also may include a diode and a transistor, with the predetermined value defined by the voltage rating of the diode plus the turn-on voltage of the transistor. The transistor may include a diode (e.g., body diode), which is adapted to precharge the capacitor.

The control means may be adapted to switch on backup power storage when the voltage of the holdup means reaches a predetermined minimum value defined by the turn-on voltage of the transistor. The holdup means and control means also may be adapted for operation with both a single-phase and a three-phase rectified alternating current source.

A method of the present invention for maintaining power factor when voltage temporarily decreases in a system includes monitoring the input voltage, and in particular, the difference between an input source and a holdup capacitor, and switching power from the input source to the holdup capacitor when the difference exceeds a predetermined amount defined by the voltage rating of a diode plus the turn-on voltage of a transistor. The method further may include charging the holdup capacitor to the maximum (i.e., peak) voltage of the input source and limiting the current when performing the step of charging. A diode within the transistor may be used to recharge the capacitor, or a separate diode may be used.

Another embodiment of the present invention is directed to a power holdup circuit for maintaining the energy supplied by a power supply monitoring circuit monitors the power supply voltage to detect a power dropout condition. The power holdup circuit also includes a power switching circuit that includes an energy storage device. The energy storage device stores energy for maintaining the voltage supplied by the power supply. The power switching circuit also includes a select circuit that enables the stored energy in the energy storage device in a first mode of operation and enables the release of energy stored in the energy storage device in a second mode of operation. The monitoring circuit generates a control signal for selecting the mode of operation of the select circuit in accordance with the energy supplied by the power supply. Further, the monitoring circuit protects the power holdup circuit by selectively entering the first mode of operation in response to a power dropout condition.

Thus, the present invention provides a circuit and method for maintaining high power factor without the need for complex monitoring and control. The circuit monitors the input voltage and switches to a holdup power source to provide power upon detecting a threshold change in input voltage.

Further areas of applicability of the present invention will become apparent from the detailed description provided hereinafter. It should be understood that the detailed description and specific examples, while indicating embodiments of the invention, are intended for purposes of illustration only and are not intended to limit the scope of the invention.

BRIEF DESCRIPTION OF THE DRAWINGS

The present invention will become fully understood from the detailed description and the accompanying drawings, wherein.

DETAILED DESCRIPTION

The following description of the present invention is merely exemplary in nature and is in no way intended to limit the invention, its application, or uses. Thus, although the application of the present invention as disclosed herein is generally directed to a circuit having specific component parts for implementing a circuit to maintain high power factor that is sustained during a line voltage dropout, it is not so limited, and variations and modifications in design and construction are contemplated.

Figure 1:
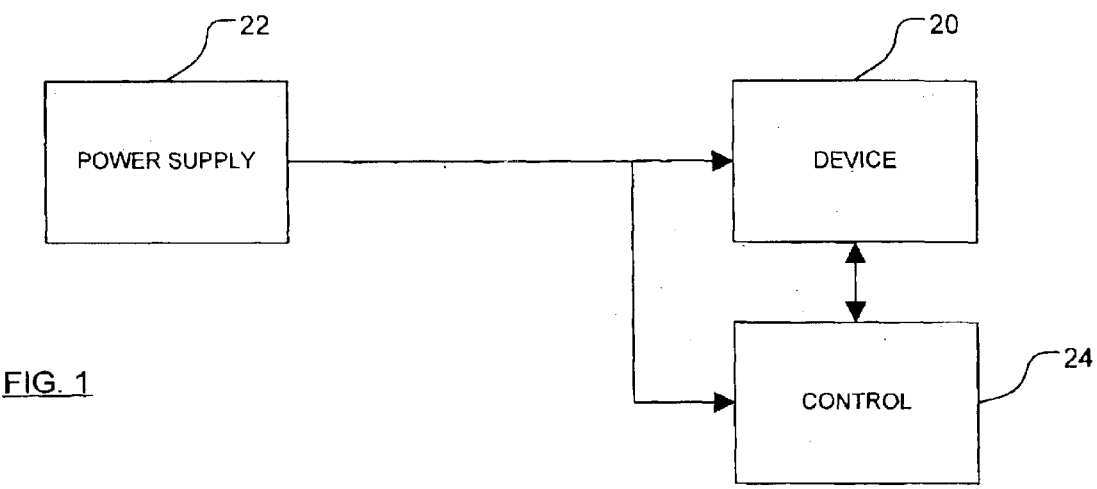
FIG. 1 is a simplified block diagram of a known system for providing power factor correction.

With respect to controlling an electrical power source to provide high power factor in a system, this may be further understood with reference to FIG. 1. Thus, before further describing the invention, it is useful to understand the control needed to maintain the power factor of a system during line voltage dropouts (i.e., power factor correction).

Generally, power factor correction for maintaining high power factor during line voltage dropouts has been provided using an external control. In particular, and as shown in FIG. 1, a device 20 (e.g., power conversion device) powered by a power supply 22 (e.g., rectified AC source) may experience phase shifts and harmonics in the electrical power. In order to offset these conditions, an external power factor correction control 24, which may be passive or active, is provided to monitor the power supply 22 and to maintain higher power factor. Specifically, the external power factor correction control 24 typically includes complex circuits for monitoring and controlling electrical power from the power supply 22. In particular, the external power factor correction control 24 generally monitors the input voltage, the output voltage, and the input current in order to determine whether voltage adjustments are necessary to maintain a high power factor.

Figure 2:
FIG. 2 is a simplified block diagram of a system having a holdup circuit constructed according to the principles of the present invention therein.

Having described an external power factor correction control 24 for monitoring electrical power from a power supply 22 to maintain high power factor, the present invention provides a holdup circuit with high power factor during line voltage dropouts that may be simply provided as part of device 20. In general, and as shown in FIG. 2, the holdup circuit 26 is provided as part of the device 20 (i.e., no external control required) to monitor and control electrical power from the power supply 22. The holdup circuit 26 provides for switching to a holdup power source 32 to sustain a high power factor during a line voltage dropout. For example, semiconductor processing equipment must withstand a voltage drop of fifty percent on one phase of a three phase input line.

Figure 3:
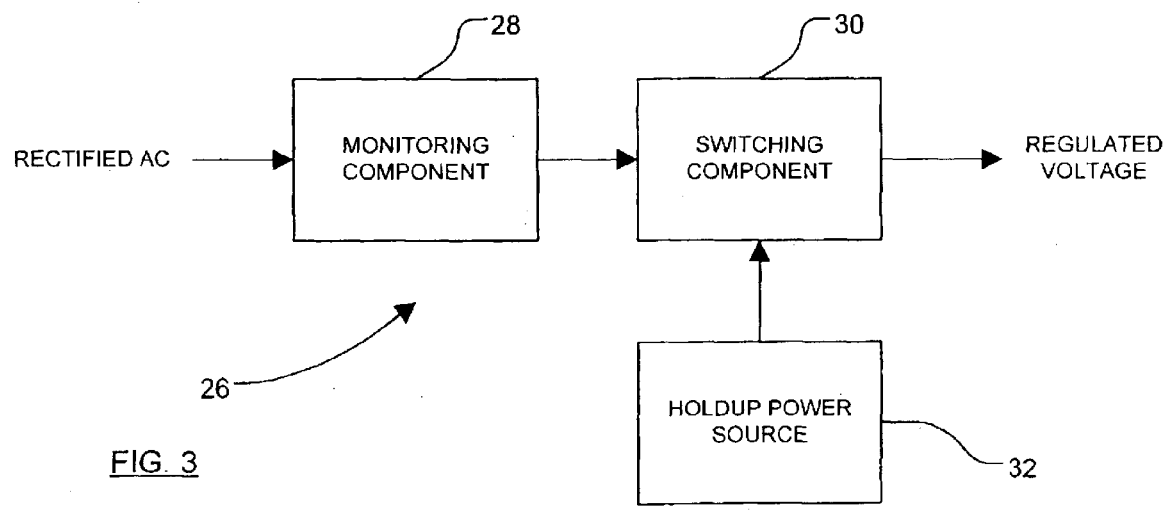
FIG. 3 is a simplified block diagram of a holdup circuit of the present invention.

More specifically, and as shown in FIG. 3, the holdup circuit 26 includes a monitoring component 28 for monitoring an input electrical power supply 22 (e.g., rectified AC power source) and a switching component 30 for switching to a holdup power source 32 during a line voltage dropout to provide a regulated voltage with a high power factor. The monitoring component 28 monitors incoming voltage to determine when electrical power from the holdup power source 32 is needed.

Figure 4:
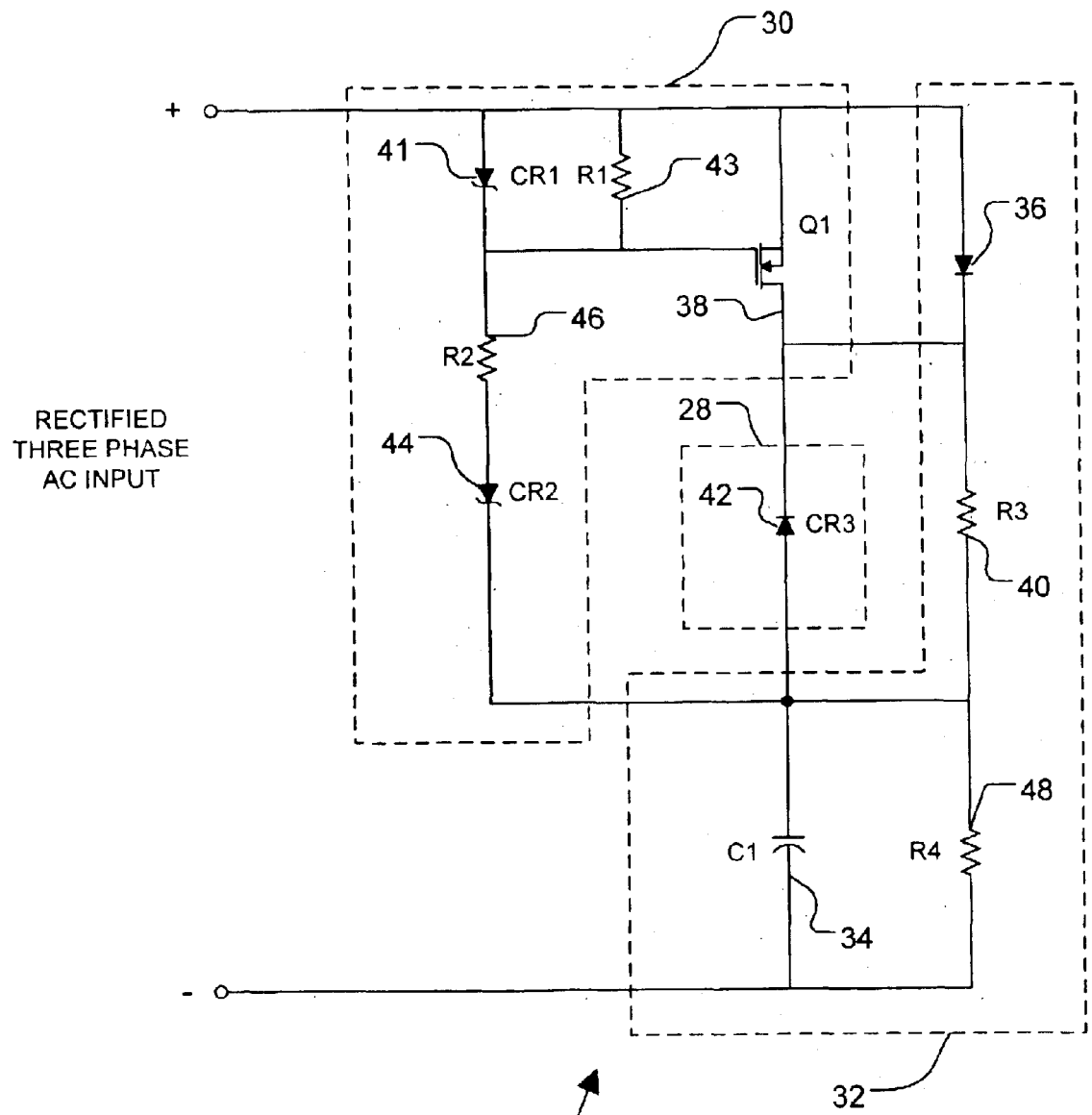
FIG. 4 is a schematic diagram of a holdup circuit of the present invention.

In the embodiment shown in FIG. 4, holdup circuit 26 may receive a rectified three-phase AC input that is maintained at a high power factor (i.e., about 0.9 or higher). It should be noted that the present invention is not limited to controlling a particular type of input, and may control, for example, a rectified single-phase AC input. As shown in FIG. 4, a hold-up capacitor (C1) 34 charges through diode 36 of transistor (Q1) 38 upon power-up of device 20. Preferably, capacitor 34 is charged to the peak voltage of the rectified AC input. It should be noted that diode 36 comprises the body diode of transistor 38. It should also be noted that transistor 38 is preferably a metal-oxide-silicon field-effect transistor (MOSFET) or an insulated-gate bipolar transistor (IGBT). Resistor (R3) 40 is a precharge resistor that limits the charging current to a value that will not damage diode 36. It should further be noted that depending upon operating conditions (e.g., temperature) the rating of the capacitor 34 may be modified (e.g., higher ripple capability or higher temperature operation).

Hold-up capacitor 34 is preferably charged and remains charged to the peak value of the unregulated input DC rail (i.e., power source). In operation, and during an AC line voltage dropout, voltage at the anode of diode (CR3) 42 becomes positive with respect to the source of Q1 38. When the voltage difference between the unregulated DC rail and the voltage at the anode of CR3 42 (i.e., fully charged voltage of holdup capacitor 34) reaches the sum of the voltage rating of zener diode (CR2) 44 plus the turn-on voltage of transistor 38, transistor 38 turns on and connects the holdup capacitor 34 across the DC rail. It should be noted that transistor 38 will turn off when the holdup capacitor 34 is discharged to the point where it can no longer maintain transistor 38 turned on, or when the line voltage dropout is over and the line voltage (i.e. rail voltage) is restored.

It should be noted that zener diode (CR1) 41 provides overvoltage protection to the gate of transistor 38. Further, resistor (R1) 43 provides that transistor 38 is completely turned off when not experiencing a line voltage dropout. Resistor (R2) 46 provides current limiting for diode 41 and diode 44 during line voltage dropout. Resistor (R4) 48 discharges the hold-up capacitor (C1) 34 when equipment is turned off.

It should be noted that as the loading on the power supply reaches its maximum and/or line frequency is reduced, the voltage ripple across the DC rail gets larger. Under this condition, transistor 38 will turn on every time the DC rail voltage is near its lowest point (i.e., valley) and limit the ripple magnitude. Thus, the DC rail is stiffened (i.e., less ripple) without reducing power factor. It should also be noted that the only inductance in the holdup circuit 26 is located within the input AC line filter, and only enough to ensure that conducted emissions are filtered.

Figure 5:
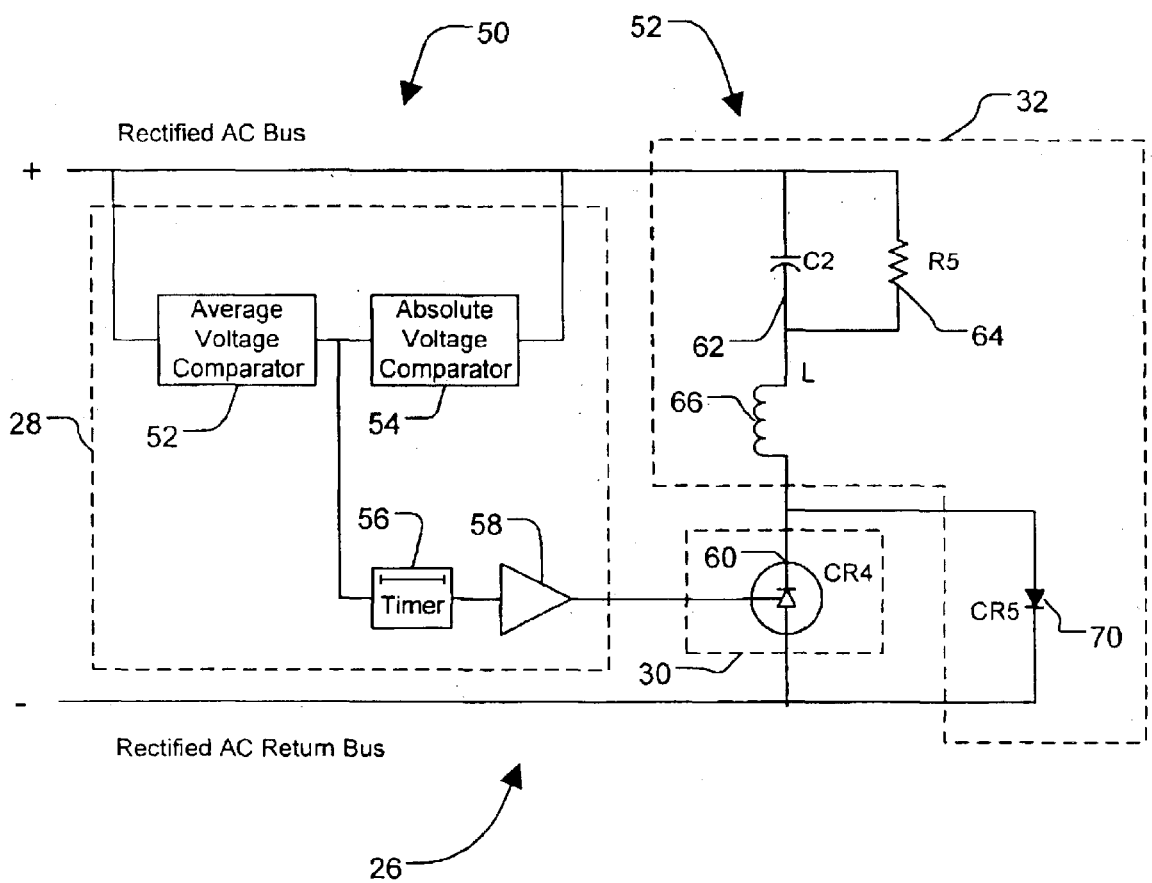
FIG. 5 is a schematic diagram of another embodiment of a holdup circuit arranged in accordance with the principles of the present invention.

FIG. 5 depicts an embodiment of the power holdup circuit arranged in accordance with the principles of the present invention. The circuit of FIG. 5 generally comprises a control circuit 50 and a power switching circuit 52 arranged between positive and negative voltage rails that supply power output by a power supply, such as power supply 22 of FIG. 2. These two sections implement the monitoring component 28, the switching component 30, and the holdup power source 32 described with respect to FIG. 3.

Control circuit 50 implements the monitoring component 28 of FIG. 3. Control circuit 50 includes an average voltage comparator 52 and absolute voltage comparator 54. Average voltage comparator 52 and absolute voltage comparator 54 cooperate to determine a voltage dropout condition and activate timer 56. Timer 56 in turn sends a control signal to a driver 58. The output from driver 58 is applied to power switching circuit 52.

Power switching circuit 52 implements the switching component 30 and the holdup power source 32 of FIG. 3. The output signal from driver 58 controls a discharge thyristor (CR4) 60. Discharge thyristor 60 controls the discharge of holdup capacitor (C2) 62. Holdup capacitor 62 is connected in parallel with a bleeder resistor (R5) 64, and the parallel connection of capacitor 62 and resistor 64 is connected in series with a current limiting inductor 66. A charge diode (CR5) 70 is connected in parallel with thyristor 60, and the parallel connection is connected in series with inductor 66.

In operation, thyristor 60 is normally off so that a current path is created between the positive and negative rails through capacitor 62, inductor 66, and diode 70. This charges holdup capacitor 62 so that the holdup capacitor 62 can store energy in order to supply the stored energy during dropout conditions. Inductor 66 limits the maximum value of current flowing through this current path during the charging of capacitor 62.

Further in operation, control circuit 50 utilizes average voltage comparator 52 and absolute voltage comparator 54 to determine when a predetermined voltage dropout has occurred. Average voltage comparator 52 monitors the momentary voltage output by the power supply relative to the average voltage output by the power supply. Absolute voltage comparator 54 monitors the absolute voltage output by the power supply relative to a predetermined reference voltage. A voltage dropout event is considered recognized when the momentary voltage output by the power supply simultaneously falls below the predetermined reference voltage and below a predetermined threshold level of the average voltage output by the power supply. In this manner, average voltage comparator 52 and absolute voltage comparator 54 cooperate to detect voltage dropouts, but also cooperate to guard against correcting for an excessive voltage dropout event, which could possibly adversely affect the components of holdup power source 32. Once average voltage comparator 52 and absolute voltage comparator 54 cooperate to detect a power dropout event that may be corrected using stored energy from holdup power source 32, the control signal activates timer 56. Timer 56 guards against correcting for prolonged dropouts in the power supply voltage to further protect the components of holdup power source 32. If the duration of the voltage dropout event is less than the predetermined time period, timer 56 sends a control signal to driver 58. If the duration of the voltage dropout event exceeds a predetermined time period, timer 56 prohibits operation of driver 58.

Activating driver 58 in turn activates thyristor 60. Once thyristor 60 is activated, holdup capacitor 62 discharges the stored energy to the power supply bus through thyristor 60 and inductor 66, thereby maintaining the voltage across the power supply bus. Thus, switching component 30 implements two modes of operation, a charge mode and a discharge mode.

With respect to the invention described herein, one skilled in the art will recognize that several alternatives to the circuit can be implemented while maintaining the desired holdup capability. For example, current limiting inductor 66 may be implemented as any current limiting device known in the art. Likewise, transistor 38 and thyristor 60 may be implemented as one of a field effect transistor (FET), a metal-oxide-silicone field-effect transistor (MOSFET), an integrated-gate bipolar transistor (IGBT), or bipolar transistor. The selection of the particular switching device will vary in accordance with the particular implementation and the power supply to be held up. Further, the energy storage devices, embodied in this description as capacitor 34 and capacitor 62, may be implemented using other alternative storage devices, including batteries, accumulators, or other electrochemical storage devices. Further yet, charging of the storage devices can be implemented using the main rectifier charging circuit described herein, or more complex charging circuits, such as soft-start charging circuits or separate dedicated charging circuits.

With respect to the control circuits, embodied herein as monitoring component 28, such control circuits can be implemented as shown, or alternatively, can be implemented in a variety of analog or digital control configurations, including digital hardware, digital software, or firmware, or combinations of these structures. One skilled in the art will further recognize that the power holdup circuit embodied herein can also include various protection circuits, including a voltage clamp, fuse protection, switch protection, overcurrent protection, or timers for repeated-operation protection.

Although the present invention has been described in connection with specific component parts providing high power factor, it is not so limited. For example, in constructing a holdup circuit, the various components may be modified or replaced depending upon system requirements and the characteristics of the input line voltage.

The description of the invention is merely exemplary in nature and, thus, variations that do not depart from the gist of the invention are intended to be within the scope of the invention. Such variations are not to be regarded as a departure from the spirit and scope of the invention as claimed.

What is claimed is:

1. A power holdup circuit for maintaining a voltage supplied by a power supply comprising:
   a monitoring circuit, the monitoring circuit monitoring the power supply voltage to detect a power dropout condition;
   a power switching circuit including:
      an energy storage device, the energy storage device storing energy for maintaining the voltage supplied by the power supply;
      a select circuit, the select circuit enabling the storage of energy in the energy storage device in a first mode of operation and enabling the release of energy stored in the energy storage device in a second mode of operation,
   wherein the monitoring circuit generates a control signal for selecting the mode of operation of the select circuit in accordance with the energy supplied by the power supply, and wherein the monitoring circuit protects the power holdup circuit by selectively entering the first mode of operation in response to a power dropout condition.

2. The power holdup circuit of claim 1 wherein the monitoring circuit selects the second mode of operation in response to a power dropout condition and selects the first mode of operation if the power dropout condition exceeds a predetermined time period.

3. The power holdup circuit of claim 2 wherein the monitoring circuit selects the second mode of operation in response to a power dropout condition and selects the first mode of operation if the voltage drop during a power dropout condition exceeds a predetermined value.

4. The power holdup circuit of claim 1 wherein the monitoring circuit selects the second mode of operation in response to a power dropout condition and selects the first mode of operation if the voltage drop during a power dropout condition exceeds a predetermined value.

5. The power holdup circuit of claim 1 wherein the monitoring circuit further comprises:
   a first circuit for comparing the power supply voltage relative to a reference voltage; and
   a second circuit for comparing the power supply voltage to an average of the power supply voltage.

6. The power holdup circuit of claim 1 wherein the monitoring circuit selects the second mode of operation when the power supply voltage falls below the reference voltage and the power supply voltage falls below the average of the power supply voltage.

7. The power holdup circuit of claim 1 wherein the monitoring circuit further comprises a timer circuit, the timer circuit determining a duration of a power dropout, wherein the monitoring circuit selects the second mode of operation when the duration of the power dropout exceeds a predetermined time period.

8. The power holdup circuit of claim 1 wherein the power switching circuit further comprises a charge circuit for controlling the charging of the energy storage device.

9. The power holdup circuit of claim 8 further comprising a current limiting device in series with the energy storage device.

10. The power holdup circuit of claim 9 further comprising a switch in series with the current limiting device to enable charging during the first mode of operation.

11. The power holdup circuit of claim 8 wherein the charge circuit further comprises one of the group of a soft-start charger, a dedicated charger, and a main rectifier charger.

12. The power holdup circuit of claim 1 wherein the energy storage device comprises one of the group of a battery, an accumulator, a capacitor, and an electrochemical device.

13. The power holdup circuit of claim 1 wherein the select circuit includes one of the group of a thyristor, a silicon controlled rectifier, a FET, a MOSFET, an IGBT, and a bipolar transistor.

14. A power holdup circuit for maintaining an energy supplied by a power supply comprising:
   a monitoring circuit, monitoring circuit monitoring the power supply voltage to detect a power dropout condition the monitoring circuit including:
      a first circuit for comparing the power supply voltage relative to a reference voltage; and
      a second circuit for comparing the power supply voltage to an average of the power supply voltage;
   a power switching circuit including:
      an energy storage device, the energy storage device storing energy for maintaining the voltage supplied by the power supply;
      a select circuit, the select circuit enabling the storage of energy in the energy storage device in a first mode of operation and enabling the release of energy stored in the energy storage device in a second mode of operation,
   wherein the monitoring circuit generates a control signal for selecting the mode of operation of the select circuit in accordance with the energy supplied by the power supply, and wherein the monitoring circuit protects the power holdup circuit by selectively entering the first mode of operation in response to a power dropout condition.

15. The power holdup circuit of claim 14 wherein the monitoring circuit selects the second mode of operation when the power supply voltage falls below the reference voltage and the power supply voltage falls below the average of the power supply voltage.

16. The power holdup circuit of claim 15 wherein the monitoring circuit selects the second mode of operation in response to a power dropout condition and selects the first mode of operation if the power dropout condition exceeds a predetermined time period.

17. The power holdup circuit of claim 16 wherein the monitoring circuit selects the second mode of operation in response to a power dropout condition and selects the first mode of operation if the voltage drop during a power dropout condition exceeds a predetermined value.

18. The power holdup circuit of claim 15 wherein the monitoring circuit selects the second mode of operation in response to a power dropout condition and selects the first mode of operation if the voltage drop during a power dropout condition exceeds a predetermined value.

19. The power holdup circuit of claim 14 wherein the monitoring circuit further comprises a timer circuit, the timer circuit determining a duration of a power dropout, wherein the monitoring circuit selects the second mode of operation when the duration of the power dropout exceeds a predetermined time period.

20. The power holdup circuit of claim 19 wherein the power switching circuit further comprises a charge circuit for controlling the charging of the energy storage device.

21. The power holdup circuit of claim 20 further comprising a current limiting device in series with the energy storage device.

22. The power holdup circuit of claim 21 further comprising a switch in series with the current limiting device to enable charging during the first mode of operation.

23. The power holdup circuit of claim 20 wherein the charge circuit further comprises one of the group of a soft-start charger, a dedicated charger, and a main rectifier charger.

24. The power holdup circuit of claim 14 wherein the energy storage device comprises one of the group of a battery, an accumulator, a capacitor, and an electrochemical device.

25. The power holdup circuit of claim 14 wherein the select circuit includes one of the group of a thyristor, a silicon controlled rectifier, a FET, a MOSFET, an IGBT, and a bipolar transistor.

* * * * *